United States Patent
Kimura et al.

(10) Patent No.: US 9,568,098 B2
(45) Date of Patent: Feb. 14, 2017

(54) CONTROLLER FOR VEHICLE TRANSMISSION

(71) Applicants: Motonori Kimura, Toyota (JP); Daisuke Inoue, Toyota (JP); Atsushi Ayabe, Toyota (JP); Shuhei Ishikawa, Toyota (JP); Hiroki Kondo, Miyoshi (JP); Akira Hino, Toyota (JP); Kenji Matsuo, Toyota (JP); Takuro Shimazu, Miyoshi (JP)

(72) Inventors: Motonori Kimura, Toyota (JP); Daisuke Inoue, Toyota (JP); Atsushi Ayabe, Toyota (JP); Shuhei Ishikawa, Toyota (JP); Hiroki Kondo, Miyoshi (JP); Akira Hino, Toyota (JP); Kenji Matsuo, Toyota (JP); Takuro Shimazu, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/386,349

(22) PCT Filed: Apr. 16, 2013

(86) PCT No.: PCT/JP2013/061316
§ 371 (c)(1),
(2) Date: Sep. 19, 2014

(87) PCT Pub. No.: WO2014/170959
PCT Pub. Date: Oct. 23, 2014

(65) Prior Publication Data
US 2016/0091090 A1    Mar. 31, 2016

(51) Int. Cl.
*F16H 61/66* (2006.01)
*F16H 61/662* (2006.01)
*F16H 37/02* (2006.01)

(52) U.S. Cl.
CPC .......... *F16H 61/662* (2013.01); *F16H 37/022* (2013.01); *F16H 61/66259* (2013.01); *F16H 2037/026* (2013.01); *F16H 2061/6603* (2013.01)

(58) Field of Classification Search
CPC ............ F16H 2061/6604; F16H 37/022; F16H 61/662; F16H 61/66254
See application file for complete search history.

(56) References Cited

U.S. PATENT DOCUMENTS 3,340,749 A * 9/1967 Schreiner ............ F16H 37/0846
                                                        475/211
4,867,732 A * 9/1989 Soga ..................... B60W 30/18
                                                        474/28

(Continued)

FOREIGN PATENT DOCUMENTS

JP          3-61762          3/1991

*Primary Examiner* — Ramya Burgess
*Assistant Examiner* — David Morris
(74) *Attorney, Agent, or Firm* — Finnegan, Henderson, Farabow, Garrett & Dunner, LLP

(57) ABSTRACT

A controller for a vehicle transmission is disclosed. The controller may include an electronic control unit configured to carry out a change shift for changing a path of the transmission of power between a first transmission path and a second transmission path by engaging a predetermined clutch mechanism. The electronic control unit may also be configured to set a change speed ratio region that defines a range of a speed ratio of the first transmission mechanism such that a rotation speed difference between engagement members of the clutch mechanism, which are engaged with each other in carrying out the change shift, is smaller than or equal to a predetermined value. When a speed ratio outside the change speed ratio region is set in the first transmission mechanism, the change shift is not carried out.

6 Claims, 10 Drawing Sheets

(56) References Cited

U.S. PATENT DOCUMENTS

| | | | | |
|---|---|---|---|---|
| 5,021,031 A | * | 6/1991 | Hibi | F16H 61/66259 |
| | | | | 474/18 |
| 5,853,343 A | * | 12/1998 | Eggert | F16H 37/022 |
| | | | | 475/210 |
| 2006/0247086 A1 | * | 11/2006 | Watanabe | B60K 6/365 |
| | | | | 475/208 |

* cited by examiner

FIG. 2

|  | C1 | C2 | C3 | B |
|---|---|---|---|---|
| START MOVING | ON | OFF | ON | OFF |
| FORWARD TRAVELING | OFF | ON | ON OR OFF | OFF |
| REVERSE TRAVELING | OFF | OFF | ON | ON |
| NEUTRAL | OFF | OFF | ON OR OFF | OFF |

CONTROLLER FOR VEHICLE TRANSMISSION

CROSS-REFERENCE TO RELATED APPLICATIONS

This application is a national phase application of International Application No. PCT/JP2013/061316, filed Apr. 16, 2013, the content of which is incorporated herein by reference.

TECHNICAL FIELD

The invention relates to a controller for a vehicle transmission in which two power transmission paths having different speed ratios are provided in parallel with each other between an input shaft and an output shaft.

BACKGROUND ART

A general engine that is used as a driving force source for a vehicle has such a characteristic that the output torque increases with an increase in rotation speed. In contrast, driving force that is required of a vehicle is usually relatively large in the case of a low vehicle speed, and is relatively small in the case of a high vehicle speed. That is, when the vehicle that uses the engine as a driving force source travels, torque having an opposite tendency to the output characteristic of the engine is required. When the engine is operated, an operating point at which the engine has a high efficiency is limited. Therefore, in the vehicle that uses the engine as a driving force source, a transmission is mounted. The transmission is able to change the speed ratio as needed. By setting the speed ratio as needed with the transmission on the basis of a traveling state of the vehicle, such as a vehicle speed and an accelerator operation amount, a required driving force is obtained, and the engine is operated at an operating point having a high efficiency.

Among transmissions that are mounted on the thus configured vehicle, a stepped transmission that sets the speed ratio stepwise for each speed position has a step between the set speed ratios, so the engine cannot be constantly operated at an operating point having a high efficiency. For example, when the rotation speed of the engine at an operating point having a high efficiency is a rotation speed that can be set at a speed ratio between two speed positions, the efficiency decreases in an operating state in a period from one of the speed positions to the other one of the speed positions. Therefore, in recent years, a vehicle on which a continuously variable transmission is mounted instead of the stepped transmission has become widespread. The continuously variable transmission is able to continuously change its speed ratio.

A belt-type continuously variable transmission is widely known as a continuously variable transmission for a vehicle. The belt-type continuously variable transmission includes a belt for transmitting power and a pair of pulleys each of which has a groove in which the belt is wound. The winding radius of the belt on each of the pair of pulleys increases or decreases with a change in the width of a corresponding one of the grooves. By changing the winding radii of the belt through changing the groove width of each of the pulleys, the continuously variable transmission steplessly changes its speed ratio that is set between those pair of pulleys.

In order to set a speed ratio higher than the maximum speed ratio of the continuously variable transmission or set a speed ratio lower than the minimum speed ratio of the continuously variable transmission, Japanese Patent Application Publication No. 3-61762 (JP 3-61762 A) describes the configuration of a transmission that combines a belt-type continuously variable transmission mechanism with a gear-type stepped transmission mechanism. In the transmission having the configuration described in JP 3-61762 A, by changing a power transmission path between the continuously variable transmission mechanism and the stepped transmission mechanism, it is possible to set the speed ratio higher than the maximum speed ratio or the speed ratio lower than the minimum speed ratio. The maximum speed ratio and the minimum speed ratio are allowed to be set in the continuously variable transmission. As a result, it is possible to expand the width of speed ratio that is allowed to be set by the transmission as a whole.

A controller for the transmission described in JP 3-61762 A employs the above-described transmission as a controlled object. In the transmission, a continuously variable transmission mechanism and a stepped transmission mechanism are provided in parallel with each other. In changing from a stepped transmission path to a continuously variable transmission path, a shift in the continuously variable transmission mechanism is prohibited until the change completes. The stepped transmission path transmits power via the stepped transmission mechanism. The continuously variable transmission path transmits power via the continuously variable transmission mechanism.

As described above, by forming the transmission in which the stepped transmission mechanism is provided in parallel with the continuously variable transmission mechanism, it is possible to expand the width of speed ratio that is allowed to be set by the transmission as a whole. Conversely, when a shift is carried out in the continuously variable transmission mechanism at the time of changing the power transmission path between the continuously variable transmission mechanism and the stepped transmission mechanism, a deviation increases between the speed ratio that is set in the continuously variable transmission mechanism and the speed ratio that is set in the stepped transmission mechanism. As a result, there is a possibility that a shock in the change increases, driving force becomes insufficient after the change or the engine rotation speed increases more than necessary.

Facing such problems, the controller for the transmission described in JP 3-61762 A keeps the speed ratio by prohibiting a shift in the continuously variable transmission mechanism in the period until the change from the stepped transmission mechanism to the continuously variable transmission mechanism completes as described above, thus making it possible to reduce a shift shock during the change and obtain desired power performance.

The above-described change of the power transmission path between the continuously variable transmission mechanism and the stepped transmission mechanism is usually carried out with engagement or releasing operation of a clutch. For example, in the configuration of the transmission described in JP 3-61762 A, the power transmission path is changed by engaging a "high clutch 60". At this time, when a shift is prohibited in the continuously variable transmission mechanism and the speed ratio is kept as described above, differential rotation increases between friction materials in the "high clutch 60 and the durability of the clutch may decrease. That is, the continuously variable transmission mechanism generally hydraulically controls an actuator that is operated in order to set a speed ratio or a transmitted torque capacity. Therefore, there is an inevitable response delay at the time of hydraulic control, and there is a limit in trackability of an actual speed ratio to a target value of the speed ratio. For example, when the vehicle rapidly decelerates and then re-accelerates or starts moving again, the speed ratio of the continuously variable transmission mechanism may not have returned to the maximum speed ratio. When a shift is prohibited in the continuously variable transmission mechanism and the speed ratio is kept in such a state, a deviation increases between the speed ratio of the stepped transmission mechanism and the speed ratio that is set in the continuously variable transmission mechanism. Thus, differential rotation also increases in the clutch that is engaged for changing the power transmission path. As a result, friction increases at the time when the friction materials of the clutch engage with each other, so the durability of the clutch decreases. In addition, an engagement shock also increases at the time when the clutch is engaged.

SUMMARY OF THE INVENTION

The invention is made by focusing on the above-described technical problems. That is, the invention employs an automatic transmission for a vehicle as a controlled object, in which a transmission path including a continuously variable transmission mechanism and a transmission path including another transmission mechanism, such as a gear-type stepped transmission mechanism, different from the continuously variable transmission mechanism are provided in parallel with each other. It is an object of the invention to provide a controller for a vehicle transmission, which is able to prevent or suppress a shock in changing an actually power transmitting path between those two transmission paths and a decrease in durability of a clutch, or the like, that is operated during the change.

In order to solve the above-described problems, the invention is a controller for a vehicle transmission in which a first transmission path including a first transmission mechanism that continuously changes its speed ratio and a second transmission path including a second transmission mechanism having a set speed ratio different from that of the first transmission mechanism are provided in parallel with each other between an input shaft to which torque is input from a driving force source of a vehicle and an output shaft that outputs torque to an output member. The vehicle transmission is configured to carry out transmission of power between the input shaft and the output shaft via one of the first transmission path and the second transmission path. The controller includes: performing means for carrying out a change shift for changing a path of the transmission of power between the first transmission path and the second transmission path by engaging a predetermined clutch mechanism; and setting means for setting a change speed ratio region that defines a range of a speed ratio of the first transmission mechanism such that a rotation speed difference between engagement members of the clutch mechanism, which are engaged with each other in carrying out the change shift, is smaller than or equal to a predetermined value. The performing means carries out the change shift when a speed ratio within the change speed ratio region is set in the first transmission mechanism.

More specifically, the invention is a controller for a vehicle transmission in which a first transmission path including a first transmission mechanism that is able to continuously change its speed ratio and a second transmission path including a second transmission mechanism having a set speed ratio different from that of the first transmission mechanism are provided in parallel with each other between an input shaft to which torque is input from a driving force source of a vehicle and an output shaft that outputs torque to an output member. The vehicle transmission carries out transmission of power between the input shaft and the output shaft via one of the first transmission path and the second transmission path. The controller includes: performing means for carrying out a change shift for changing a path of the transmission of power between the first transmission path and the second transmission path by engaging a predetermined clutch mechanism; and setting means for setting a change speed ratio region that defines a range of a speed ratio of the first transmission mechanism such that a rotation speed difference between engagement members of the clutch mechanism, which are engaged with each other in carrying out the change shift, is smaller than or equal to a predetermined value. When a speed ratio within the change speed ratio region is set in the first transmission mechanism, the change shift is carried out. When a speed ratio outside the change speed ratio region is set in the first transmission mechanism, the change shift is not carried out.

The performing means in the invention includes means for determining whether the change shift is required in response to at least any one of a traveling state of the vehicle or an operating state of the vehicle transmission, and carrying out the change shift when it is determined that the change shift is required and the speed ratio within the change speed ratio region is set in the first transmission mechanism.

The performing means in the invention includes means for carrying out the change shift after it is determined that the change shift is required and when a time during which the speed ratio outside the change speed ratio region is set in the first transmission mechanism has reached a predetermined time or longer.

In the setting means in the invention, the setting means includes means for changing and setting the width of the change speed ratio region in response to information about at least any one of an output shaft rotation speed of the output shaft and an input torque that is input to the input shaft.

The setting means in the invention includes means for narrowing the width of the change speed ratio region as the input torque increases.

The setting means in the invention includes means for expanding the width of the change speed ratio region as a rate of change in the output shaft rotation speed increases.

The invention may further include means for detecting an acceleration of the vehicle. In this case, the setting means in the invention includes means for expanding the width of the change speed ratio region as the acceleration increases.

The invention may further include means for detecting at least one of an operation amount or an operation speed of driver's accelerator operation. In this case, the setting means in the invention includes means for expanding the width of the change speed ratio region as at least any one of the operation amount and the operation speed of the accelerator operation increases.

Thus, in the invention, when the change shift for changing the transmission path, which carries out transmission of power between the input shaft and output shaft of the transmission, is carried out between the first transmission path and the second transmission path, it is determined whether the change shift is allowed. That is, it is determined whether the speed ratio of the first transmission mechanism is a speed ratio within the change speed ratio region set in order to appropriately carry out the change shift. The change speed ratio region in the invention takes into consideration a rotation speed difference between the engagement members of the clutch mechanism, and defines the range of the speed ratio of the first transmission mechanism such that the rotation speed difference is smaller than a predetermined value at the time of carrying out the change shift. When the speed ratio of the first transmission mechanism is a speed ratio within the change speed ratio region, the change shift is carried out. In contrast, when the speed ratio of the first transmission mechanism is a speed ratio outside the change speed ratio region, the change shift is not carried out. That is, the above-described change shift is carried out only under an appropriate operating state where a speed ratio within the change speed ratio region is set in the first transmission mechanism. Therefore, according to the invention, when the change shift is carried out, it is possible to set the rotation speed difference in the clutch mechanism to a state smaller than or equal to the predetermined value. As a result, it is possible to reliably prevent or suppress a shock that occurs in carrying out a change shift due to a large rotation speed difference in the clutch mechanism and a decrease in the durability of the clutch mechanism that is engaged at the time of carrying out the change shift.

According to the invention, when the speed ratio of the first transmission mechanism is a speed ratio within the change speed ratio region in addition to determination that the change shift is required as in the case of conventional shift control, the change shift is carried out. That is, even when it is determined that the change shift is required on the basis of, for example, information about the output shaft rotation speed and the accelerator operation amount, but when the speed ratio of the first transmission mechanism is a speed ratio outside the change speed ratio region, the change shift is not carried out, that is, the change shift is prohibited. Thus, the change shift is carried out only under an appropriate operating state where a speed ratio within the change speed ratio region is set in the first transmission mechanism. Therefore, it is possible to reliably prevent or suppress a shock that occurs at the time of a change shift and a decrease in the durability of the clutch mechanism.

According to the invention, in the case where it is determined that the change shift is required as described above, even when the change shift is prohibited because of the fact that the speed ratio of the first transmission mechanism is a speed ratio outside the change speed ratio region, but when the predetermined time or longer has elapsed from the timing at which it is determined that the change shift is required, the change shift is carried out. For example, when the amount of change in the vehicle speed or the acceleration is large, an increase in the vehicle speed is faster than a shift in the first transmission mechanism, with the result that there is a case where the speed ratio of the first transmission mechanism does not fall within the change speed ratio region and, therefore, the change shift is not carried out. In contrast, in this invention, by providing the predetermined time as a guard in advance, it is possible to avoid a situation that a change shift is not carried out as described above, and it is possible to appropriately carry out a change shift in accordance with determination as to whether a change shift is required.

According to the invention, the change speed ratio region that is set in order to determine whether the change shift is allowed as described above is changed in response to at least one of the output shaft rotation speed and the input torque. Therefore, it is possible to carry out an appropriate change shift in correspondence with the traveling state of the vehicle and the operating state of the transmission.

In the invention, as an example of control for changing the change speed ratio region as described above, it is possible to change and set the width of the change speed ratio region so that the width narrows as the input torque increases. In the case of the small input torque, even when a time during which the engagement members slip on each other extends because of a large rotation speed difference in the clutch mechanism, the amount of heat generated from friction at that time is relatively small. Therefore, an allowable range of the rotation speed difference in the clutch mechanism may be set relatively widely. In contrast, in the case of the large input torque, abrasion of friction plates and the amount of heat generated by friction in engaging the clutch mechanism increase. Thus, when a time during which the engagement members slip on each other extends in this case, the extended time may influence the durability of the clutch mechanism. In this case, according to the invention, by narrowing the width of the change speed ratio region as the input torque increases as described above, it is possible to appropriately prevent or suppress a decrease in the durability of the clutch mechanism.

In the invention, as another example of control for changing the change speed ratio region as described above, it is possible to change and set the width of the change speed ratio region so that the width expands as the rate of change in the output shaft rotation speed increases. As the acceleration of the vehicle increases, it is possible to change and set the width of the change speed ratio region so that the width expands. In addition, it is possible to change and set the width of the change speed ratio region so that the width expands as at least one of an operation amount and an operation speed of driver's accelerator operation increases.

For example, when the amount of change in the vehicle speed or the acceleration is large, an increase in the vehicle speed is faster than a shift in the first transmission mechanism, with the result that there is a case where the speed ratio of the first transmission mechanism does not fall within the change speed ratio region and, therefore, the change shift is not carried out. When the rate of change in the output shaft rotation speed is large as described above or when the operation amount or operation speed of accelerator operation is large, the acceleration of the vehicle is large. Thus, as described above, by expanding the width of the change speed ratio region as the rate of change in the output shaft rotation speed increases or expanding the width of the change speed ratio region as the acceleration of the vehicle increases or expanding the width of the change speed ratio region as at least one of the operation amount and the operation speed of driver's accelerator operation increases, it is possible to avoid a situation that the change shift is not carried out as described above, so it is possible to appropriately carry out the change shift.

BRIEF DESCRIPTION OF THE DRAWINGS

FIG. 2 is a table that collectively shows operation states of clutch mechanisms and a brake mechanism in the vehicle transmission shown in FIG. 1.

MODES FOR CARRYING OUT THE INVENTION

A controller according to the invention, for example, employs an automatic transmission that is mounted on a vehicle as a controlled object. Particularly, in the automatic transmission that is employed as a controlled object in this invention, a first transmission path including a first transmission mechanism and a second transmission path including a second transmission mechanism are formed between an input shaft and an output shaft. Those first transmission path and second transmission path are arranged in parallel with each other between the input shaft and the output shaft. The automatic transmission is configured to transmit torque between the input shaft and the output shaft by selecting one of those first transmission path and the second transmission path.

The first transmission mechanism provided in the above-described first transmission path constitutes a main transmission unit of the automatic transmission. The first transmission mechanism is a transmission mechanism that is able to continuously change its speed ratio, and is, for example, formed of a belt-type continuously variable transmission mechanism. On the other hand, the second transmission mechanism provided in the second transmission path constitutes an auxiliary transmission unit of the automatic transmission. The second transmission mechanism is, for example, formed of a gear transmission mechanism. The gear transmission mechanism is configured to set a speed ratio that cannot be set by the above-described belt-type continuously variable transmission mechanism. Thus, the gear transmission mechanism is formed by meshing a plurality of gears. The gear transmission mechanism is configured so that a speed ratio that is set by the gear ratio (the ratio of the numbers of teeth) of the plurality of gears becomes a speed ratio higher than a maximum speed ratio of the belt-type continuously variable transmission mechanism or a speed ratio lower than a minimum speed ratio of the belt-type continuously variable transmission mechanism. When the automatic transmission is mounted on a vehicle, the gear transmission mechanism is preferably configured to be able to set the speed ratio higher than the maximum speed ratio of the belt-type continuously variable transmission mechanism, for example, in order not to apply large torque at the time when the vehicle starts moving to the belt-type continuously variable transmission mechanism. In order to reduce a fuel consumption by reducing a rotation speed of an engine in the vehicle during traveling, the gear transmission mechanism is preferably configured to be able to set the speed ratio lower than the minimum speed ratio of the belt-type continuously variable transmission mechanism.

Figure 1:
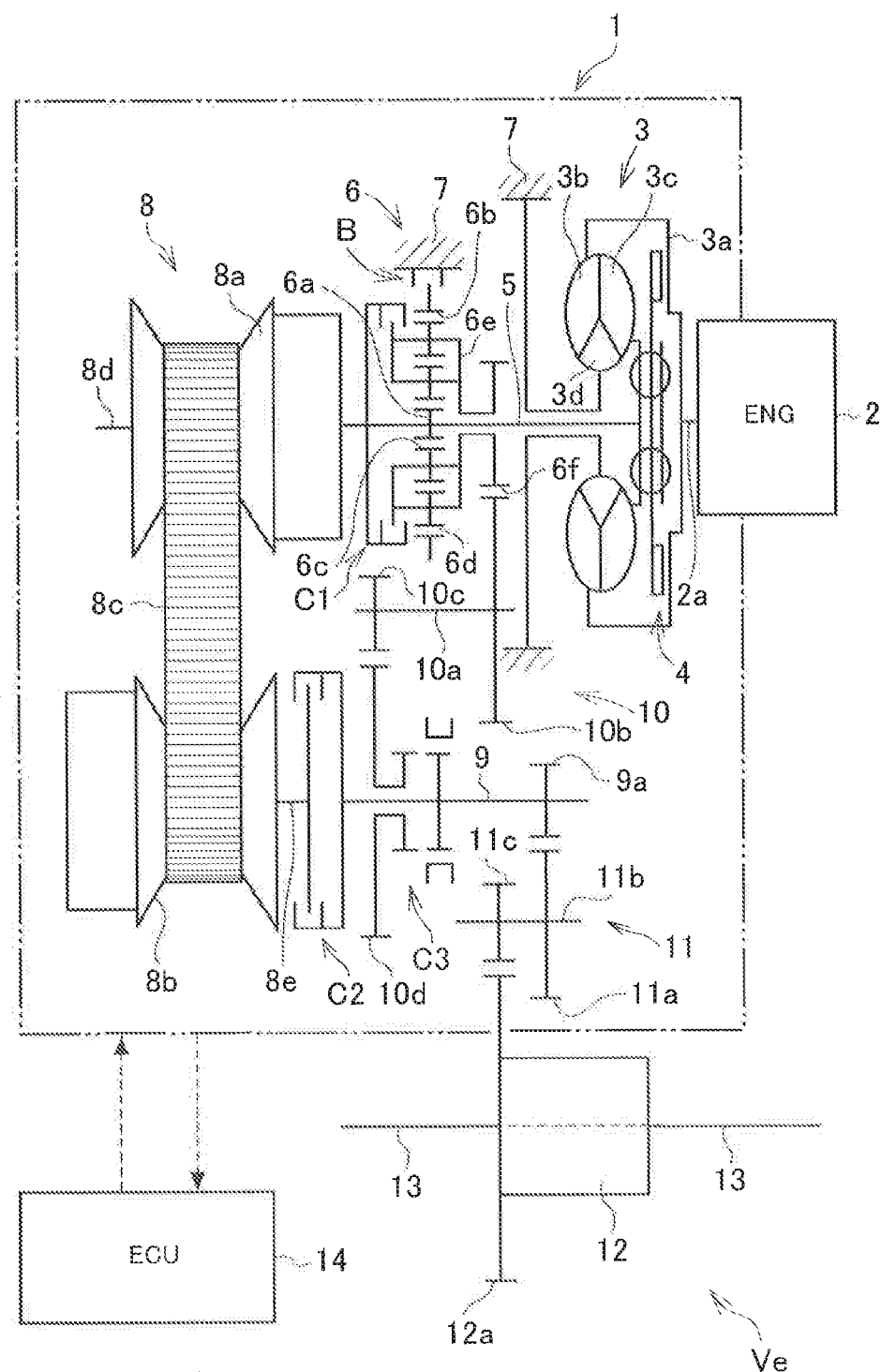
FIG. 1 is a view that shows the configuration of a vehicle transmission that is a controlled object in the invention.

An example of a specific configuration of the above-described automatic transmission is shown in FIG. 1. An automatic transmission 1 that is a controlled object in the invention is a transmission that is mounted on a vehicle Ve, and is, for example, used such that the automatic transmission 1 is coupled to a driving force source, such as an engine 2. Specifically, a torque converter 3 equipped with a lockup clutch is coupled to an output shaft 2a of the engine 2. The torque converter 3 has a conventionally known configuration. For example, a turbine runner 3c is arranged opposite a pump impeller 3b integrated with a front cover 3a. A stator 3d held via a one-way clutch (not shown) is arranged between these pump impeller 3b and the turbine runner 3c. In addition, a lockup clutch 4 that rotates integrally with the turbine runner 3c is arranged opposite the inner face of the front cover 3a. In response to a pressure difference between both sides of the lockup clutch 4, the lockup clutch 4 is configured to be set to an engaged state or a released state. In the engaged state, the lockup clutch 4 contacts the inner face of the front cover 3a and transmits torque. In the released state, the lockup clutch 4 moves away from the inner face of the front cover 3a and interrupts transmission of torque.

An input shaft 5 of the automatic transmission 1 is coupled to the turbine runner 3c in the above-described torque converter 3. A forward/reverse switching mechanism 6 is arranged along the same axis as the axis of the input shaft 5. The forward/reverse switching mechanism 6 is a mechanism for switching between a forward traveling state and a reverse traveling state. In the forward traveling state, torque output from the engine 2 is transmitted to a counter shaft 10a (described later) without changing its rotational direction. In the reverse traveling state, torque output from the engine 2 is transmitted to the counter shaft 10a while inverting its rotational direction.

In the example shown in FIG. 1, the above-described forward/reverse switching mechanism 6 is formed of a so-called differential mechanism in which three rotating elements carry out differential action with one another. Specifically, the forward/reverse switching mechanism 6 is formed of a double-pinion-type planetary gear train. The double-pinion-type planetary gear train that constitutes the forward/reverse switching mechanism 6 includes a sun gear 6a, a ring gear 6b, first pinion gears 6c, second pinion gears 6d, and a carrier 6e. The sun gear 6a is an external gear. The ring gear 6b is an internal gear and is arranged concentrically with the sun gear 6a. The first pinion gears 6c are in mesh with the sun gear 6a. Each of the second pinion gears 6d is in mesh with a corresponding one of the first pinion gears 6c and the ring gear 6b. The carrier 6e holds the first pinion gears 6c and the second pinion gears 6d such that the first pinion gears 6c and the second pinion gears 6d are rotatable on their axes and revolvable. The input shaft 5 is coupled to the above-described sun gear 6a. Thus, the sun gear 6a serves as an input element. A brake mechanism B is provided. The brake mechanism B selectively stops rotation of the ring gear 6b. Thus, the ring gear 6b serves as a reaction element. The brake mechanism B is provided between the ring gear 6b and a fixed portion 7, such as a casing. The brake mechanism B may be formed of, for example, a friction brake, such as a multi-disc brake, or an intermeshing brake.

The carrier 6e serves as an output element. A first clutch mechanism C1 is provided between the carrier 6e and the sun gear 6a or input shaft 5. The first clutch mechanism C1 is used to integrally rotate the whole planetary gear train by coupling these carrier 6e and sun gear 6a to each other. The first clutch mechanism C1 is used to set the forward/reverse switching mechanism 6 to the forward traveling state. The first clutch mechanism C1 just needs to be able to selectively transmit or interrupt torque. Thus, the first clutch mechanism C1 may be any one of a friction clutch and an intermeshing clutch. However, the first clutch mechanism C1 is preferably formed of a friction clutch of which a transmitted torque capacity gradually increases or decreases with engagement force.

A belt-type continuously variable transmission mechanism (CVT) 8 is arranged at an end (left side in the example shown in FIG. 1) of the input shaft 5 across from the engine 2. The CVT 8 has a conventionally known configuration. That is, the CVT 8 includes a primary pulley 8a, a secondary pulley 8b and a belt 8c. The primary pulley 8a is a drive-side rotating member. The secondary pulley 8b is a driven-side rotating member. The belt 8c is wound around these primary pulley 8a and secondary pulley 8b. Each of the primary pulley 8a and the secondary pulley 8b is configured such that a winding radius of the belt 8c increases or decreases with a change in the width of a groove in which the belt 8c is wound. That is, the primary pulley 8a and the secondary pulley 8b are configured to change a speed ratio by changing the width of each of the grooves in which the belt 8c is wound.

The primary pulley 8a is arranged along the same axis as the axis of the input shaft 5 on a side across the above-described forward/reverse switching mechanism 6 from the engine 2. A primary shaft 8d integrated with the primary pulley 8a is coupled to the sun gear 6a that is the input element in the forward/reverse switching mechanism 6. The secondary pulley 8b is arranged such that the rotation central axis of the secondary pulley 8b is parallel to the rotation central axis of the above-described primary pulley 8a. A secondary shaft 8e is provided along the rotation central axis of the secondary pulley 8b. The output shaft 9 is arranged along the same axis as the axis of the secondary shaft 8e. Thus, the output shaft 9 is parallel to the above-described input shaft 5.

A second clutch mechanism C2 is provided between the output shaft 9 and the secondary shaft 8e. The second clutch mechanism C2 selectively couples these output shaft 9 and secondary shaft 8e to each other. The second clutch mechanism C2 just needs to be able to selectively transmit or interrupt torque between the secondary pulley 8b and the output shaft 9. Thus, the second clutch mechanism C2 may be any one of a friction clutch and an intermeshing clutch. However, the second clutch mechanism C2 is preferably formed of a friction clutch of which a transmitted torque capacity gradually increases or decreases with engagement force.

In the automatic transmission 1 that is the controlled object in the invention, a gear train 10 is arranged in parallel with the above-described CVT 8. The gear train 10 is a gear transmission mechanism formed of a plurality of gears. The gear train 10 is configured as a transmission mechanism having a set speed ratio different from that of the CVT 8. Specifically, the gear train 10 is configured as a speed reduction mechanism or a speed increasing mechanism. The speed reduction mechanism sets a speed ratio higher than the maximum speed ratio that can be set by the CVT 8. The speed increasing mechanism sets a speed ratio lower than the minimum speed ratio that can be set by the CVT 8. In the example shown in FIG. 1, the gear train 10 is configured as the speed reduction mechanism.

As described above, the CVT 8 is configured to be able to continuously change its speed ratio, and corresponds to a first transmission mechanism in the invention. In contrast, the gear train 10 is configured to have a set speed ratio different from that of the CVT 8 as described above, and corresponds to a second transmission mechanism in the invention. Thus, a transmission path including the above-described CVT 8, that is, a transmission path from the input shaft 5 via the primary pulley 8a and secondary pulley 8b of the CVT 8 to the output shaft 9, corresponds to a first transmission path in the invention. In contrast, a transmission path including the gear train 10, that is, a transmission path from the input shaft 5 via the gear train 10 to the output shaft 9, corresponds to a second transmission path in the invention.

Specifically, in the gear train 10, the counter shaft 10a is arranged parallel to each of the input shaft 5 and the output shaft 9. A counter driven gear 10b is connected to one end (right side in the example shown in FIG. 1) of the counter shaft 10a so as to integrally rotate with the counter shaft 10a. A drive gear 6f is in mesh with the counter driven gear 10b. The drive gear 6f integrally rotates with the carrier 6e of the above-described forward/reverse switching mechanism 6. The counter driven gear 10b is a gear having a larger diameter than the drive gear 6f. Therefore, amplified torque is transmitted from the drive gear 6f to the counter driven gear 10b.

A counter drive gear 10c is connected to the other end (left side in the example shown in FIG. 1) of the counter shaft 10a so as to integrally rotate with the counter shaft 10a. The counter drive gear 10c is a gear having a smaller diameter than the above-described counter driven gear 10b. A driven gear 10d is in mesh with the counter drive gear 10c. The driven gear 10d is arranged so as to be able to relatively rotate with respect to the output shaft 9 on the above-described output shaft 9. The driven gear 10d has a larger diameter than the counter drive gear 10c. Therefore, amplified torque is transmitted from the driven gear 10d to the counter drive gear 10c. Thus, the speed ratio (gear ratio) of the gear train 10 is a speed ratio obtained by multiplying the speed ratio between the drive gear 6f and the counter driven gear 10b by the speed ratio between the counter drive gear 10c and the driven gear 10d. In the example shown in FIG. 1, the speed ratio of the gear train 10 is configured so as to be higher than the maximum speed ratio of the CVT 8.

In addition, a third clutch mechanism C3 is provided. The third clutch mechanism C3 is used to selectively set a state where the driven gear 10d is coupled to the output shaft 9 so that power is transmittable or a state where transmission of power is interrupted between the driven gear 10d and the output shaft 9. The third clutch mechanism C3 may be configured to change between two states, that is, an engaged state and a released state. That is, the third clutch mechanism C3 does not need to be configured such that the transmitted torque capacity gradually changes. Therefore, the third clutch mechanism C3 may be formed of an intermeshing clutch, such as a dog clutch and a synchronizer. In the example shown in FIG. 1, the third clutch mechanism C3 is formed of a synchronizer. The synchronizer couples the driven gear 10d to the output shaft 9 by fitting a sleeve to splines formed on a boss of the driven gear 10d and splines formed on a hub of the output shaft 9.

Torque is configured to be output from the output shaft 9 via a predetermined gear train 11 and a differential 12 to drive shafts 13 corresponding to an output member in the invention. That is, an output gear 9a is connected to an end (right side in the example shown in FIG. 1) of the output shaft 9 across from the CVT 8. A large-diameter gear 11a that is in mesh with the output gear 9a is connected to one end (right side in the example shown in FIG. 1) of a speed reduction gear shaft 11b. A small-diameter gear 11c is connected to the other end (left side in the example shown in FIG. 1) of the speed reduction gear shaft 11b. The small-diameter gear 11c is in mesh with a ring gear 12a of the differential 12. The differential 12 is configured to transmit torque, transmitted via the ring gear 12a, to drive wheels (not shown) via the right and left drive shafts 13.

An electronic control unit (ECU) 14 is provided. The ECU 14 controls the operation of the automatic transmission 1. The ECU 14 is mainly formed of a microcomputer as an example. The ECU 14 is configured to perform computations in accordance with a predetermined program on the basis of input data and prestored data and execute control over various states, such as forward traveling, reverse traveling or neutral, setting of a required speed ratio, and the like.

On the other hand, detection signals and information signals from various sensors are configured to be input to the ECU 14. For example, detection signals from a pulley rotation speed sensor (not shown), a shift position sensor (not shown), a wheel speed sensor (not shown), and the like, are configured to be input to the ECU 14. The pulley rotation speed sensor detects the rotation speed of each of the primary pulley 8a and the secondary pulley 8b. The shift position sensor detects a shift position that is selected by a shift device or a shift lever. The wheel speed sensor detects the rotation speed of each wheel of the vehicle for obtaining a vehicle speed.

The thus configured automatic transmission 1 is controlled so as to transmit torque to the output shaft 9 via a torque transmission path (that is, the second transmission path in the invention) including the gear train 10 when the vehicle starts moving in the forward direction or when the vehicle travels in the reverse direction. When the vehicle travels forward in a state where the vehicle speed has increased to some extent, the automatic transmission 1 is controlled so as to transmit torque from the input shaft 5 to the output shaft 9 via a torque transmission path including the CVT 8 (that is, the first transmission path in the invention). For example, when a drive position is selected by the shift device or shift lever (not shown), the first clutch mechanism C1 and the third clutch mechanism C3 are engaged, and the second clutch mechanism C2 and the brake mechanism B are released.

FIG. 2 collectively shows the engaged and released states of the engagement mechanisms in controlling the automatic transmission 1. In FIG. 2, "ON" indicates an engaged state, and "OFF" indicates a released state.

When the vehicle starts moving in the forward direction, torque output from the engine 2 is transmitted to the sun gear 6a of the forward/reverse switching mechanism 6 via the input shaft 5 by setting the engagement mechanisms as shown in the table of FIG. 2. Torque is also transmitted to the carrier 6e via the first clutch mechanism C1. In this case, the two rotating elements of the forward/reverse switching mechanism 6 are coupled by the first clutch mechanism C1, so the whole forward/reverse switching mechanism 6 is integrated. Thus, the forward/reverse switching mechanism 6 transmits input torque from the carrier 6e to the drive gear 6f without applying any of speed increasing action and speed reducing action. The driven gear 10d in the gear train 10 is coupled to the output shaft 9 by the third clutch mechanism C3, so torque of the input shaft 5 is transmitted to the output shaft 9 via the gear train 10. Torque is transmitted from the output gear 9a via the gear train 11 and the differential 12 to the right and left drive wheels, and the vehicle starts moving.

As described above, when the vehicle starts moving, torque is transmitted from the input shaft 5 to the output shaft 9 via the gear train 10, and the gear train 10 functions as the speed reduction mechanism. The speed ratio in this case is a speed ratio higher than the maximum speed ratio that is allowed to be set by the CVT 8. As a result, the vehicle is able to obtain large driving force. Large torque at the time when the vehicle starts moving is not applied to the CVT 8. Therefore, it is not required to increase hydraulic pressure for setting the transmitted torque capacity of the CVT 8. Thus, power that is consumed for generating hydraulic pressure decreases, so it is possible to improve fuel economy, and it is possible to improve the durability of the CVT 8.

After the vehicle starts moving, when the vehicle speed has increased to a predetermined vehicle speed, the first clutch mechanism C1 is released in a state where the speed ratio of the CVT 8 is set to the maximum speed ratio or a speed ratio close to the maximum speed ratio. At the same time, the second clutch mechanism C2 is engaged. In this case, the forward/reverse switching mechanism 6 enters a so-called free rotating state because the first clutch mechanism C1 is further released in a state where the brake mechanism B is released. As a result, transmission of power is interrupted between the input shaft 5 and the gear train 10. In contrast, the secondary pulley 8b is coupled to the output shaft 9 by the second clutch mechanism C2. As a result, the input shaft 5 and the output shaft 9 are coupled to each other so as to transmit torque via the CVT 8. Thus, by gradually reducing the speed ratio of the CVT 8 or changing the speed ratio in response to a vehicle speed and an accelerator operation amount, it is possible to set the engine rotation speed to a rotation speed at which fuel economy is high.

When changing from a torque transmission state via the gear train 10 to a torque transmission state via the CVT 8 as described above, because the speed ratio of the gear train 10 is higher than the maximum speed ratio of the CVT 8, the speed ratio or the driving force changes. Thus, when the first clutch mechanism C1 is released and the second clutch mechanism C2 is engaged, those first clutch mechanism C1 and second clutch mechanism C2 each transitionally undergo slip engagement control. That is, the engagement pressure of the second clutch mechanism C2 is gradually increased, and the transmitted torque capacity of the second clutch mechanism C2 is gradually increased. At the same time, the engagement pressure of the first clutch mechanism C1 is gradually reduced, and the transmitted torque capacity of the first clutch mechanism C1 is gradually reduced. This control is conventionally known as clutch-to-clutch control. With this configuration, torque of the output shaft 9 smoothly changes, so it is possible to suppress a shift shock.

On the other hand, when the vehicle travels in the reverse direction, the first clutch mechanism C1 and the second clutch mechanism C2 are released, and the third clutch mechanism C3 and the brake mechanism B are engaged, as shown in FIG. 2. In this case, in the forward/reverse switching mechanism 6, torque from the engine 2 is input to the sun gear 6a in a state where the ring gear 6b is fixed by the brake mechanism B. Therefore, the carrier 6e rotates in an opposite direction with respect to the sun gear 6a. Thus, as in the case where the vehicle starts moving in the forward direction, torque is transmitted from the input shaft 5 to the output shaft 9 via the gear train 10, and the output shaft 9 rotates in a direction in which the vehicle travels in the reverse direction. The speed ratio in this case is a speed ratio obtained by multiplying the speed ratio of the gear train 10 by the speed ratio of the planetary gear train that constitutes the forward/reverse switching mechanism 6. Torque is transmitted from the output gear 9a via the gear train 11 and the differential 12 to the right and left drive wheels, and the vehicle travels in the reverse direction.

As shown in FIG. 2, by releasing both the first clutch mechanism C1 and the second clutch mechanism C2, it is possible to set a neutral state where transmission of power is interrupted between the engine 2 and the output shaft 9. In this way, the operation of the forward/reverse switching mechanism 6 is controlled by controlling the engaged/released states of the first clutch mechanism C1, second clutch mechanism C2, third clutch mechanism C3 and brake mechanism B. Thus, it is possible to set each of the forward traveling state, the reverse traveling state and the neutral state. In other words, it is possible to selectively set any one of a forward rotation state, a reverse rotation state and a neutral state. In the forward rotation state, torque in the same rotational direction as the rotational direction of the power source is output from the output shaft 9. In the reverse rotation state, torque in the rotational direction opposite to the rotational direction of the power source is output from the output shaft 9. In the neutral state, transmission of power is interrupted between the power source and the output shaft 9.

As described above, the first clutch mechanism C1, the second clutch mechanism C2 and the brake mechanism B each are a clutch that is engaged when the path, which transmits power between the input shaft 5 and the output shaft 9, is changed between a first transmission path and a second transmission path, that is, when a change shift is carried out. The CVT 8 is provided in the first transmission path. The gear train 10 is provided in the second transmission path. Thus, the first clutch mechanism C1, the second clutch mechanism C2 and the brake mechanism B each correspond to a predetermined clutch mechanism in the invention.

As described above, the automatic transmission 1 that is employed as the controlled object in the invention is able to suppress an engagement shock in the clutch mechanism during a change by executing clutch-to-clutch control when a change shift is carried out between the transmission path including the CVT 8 and the transmission path including the gear train 10. However, in the clutch mechanism that is engaged in carrying out the above-described change shift, abrasion of friction materials and friction heat due to friction during slip engagement inevitably occur. At this time, when there is a large rotation speed difference between engagement members of the clutch mechanism, abrasion and heat generation of the friction materials also increase, and the durability of the clutch mechanism decreases accordingly. An engagement shock also increases.

The controller according to the invention is configured to be able to carry out the above-described change shift in an appropriate state on the basis of an actual speed ratio actually set in the CVT 8 in carrying out the change shift. Specifically, when the actual speed ratio of the CVT 8 in carrying out the change shift does not fall within a speed ratio region in which a rotation speed difference between the engagement members of the clutch mechanism that is engaged at the time of the change shift, the controller is configured not to carry out the change shift.

FIRST CONTROL EXAMPLE

Figure 3:
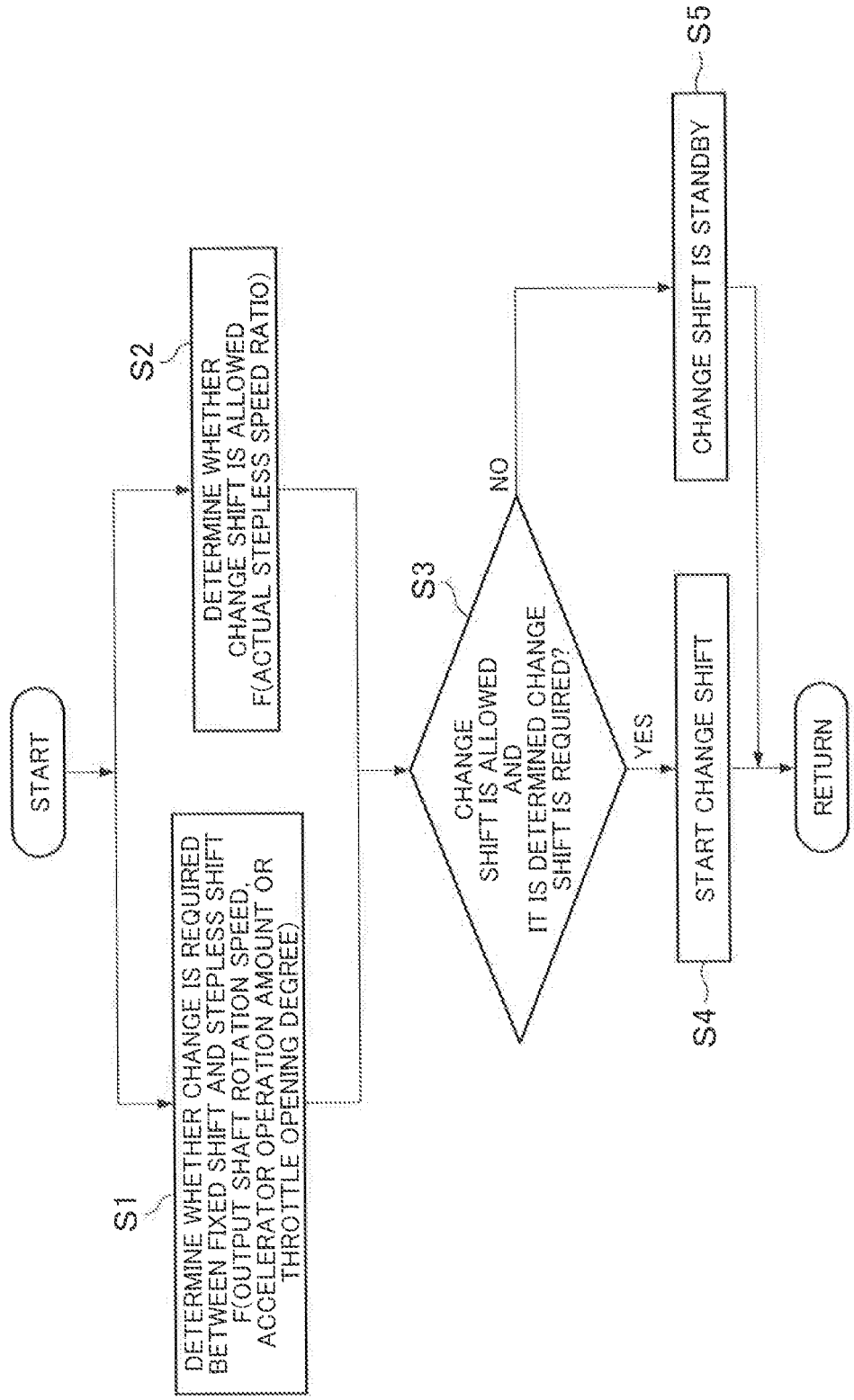
FIG. 3 is a flowchart for illustrating an example of control that is executed by a controller for the vehicle transmission according to the invention.

FIG. 3 is a flowchart for illustrating a first control example that is executed by the controller according to the invention and basic details of control of the invention. A routine shown by the flowchart is repeatedly executed at predetermined short time intervals. In FIG. 3, initially, it is determined whether it is required to change the power transmission path between first transmission path including the CVT 8 and the second transmission path including the gear train 10. That is, it is determined whether the change shift is required (step S1). This is control that is generally executed in conventional shift control, and is determined on the basis of the vehicle speed or the output shaft rotation speed of the output shaft 9 and the accelerator operation amount or a throttle opening degree. For example, it may be determined whether the change shift is required on the basis of a map or shift line chart set in association with the output shaft rotation speed and the accelerator operation amount.

Figure 4:
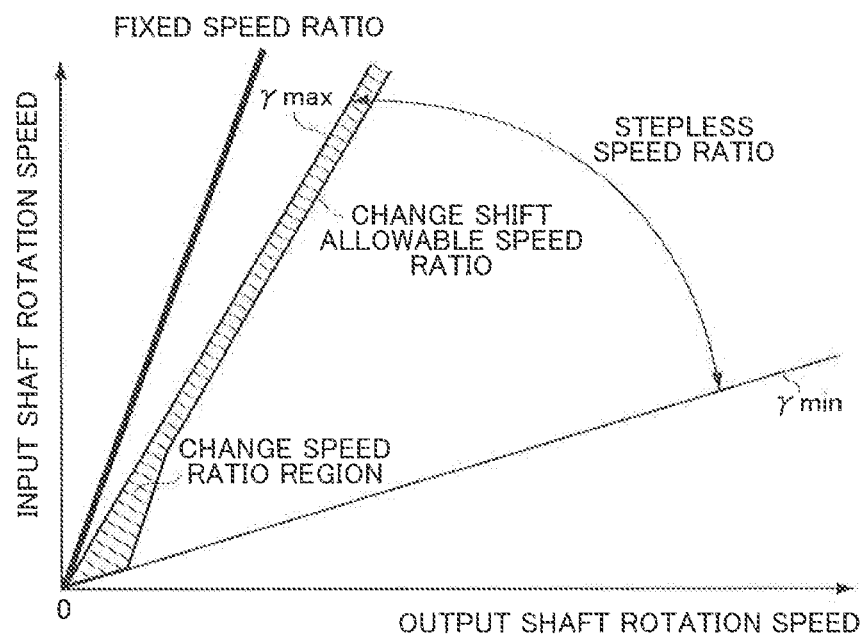
FIG. 4 is a graph for illustrating a change speed ratio region that is set at the time when control is executed by the controller for the vehicle transmission according to the invention.
Figure 5:
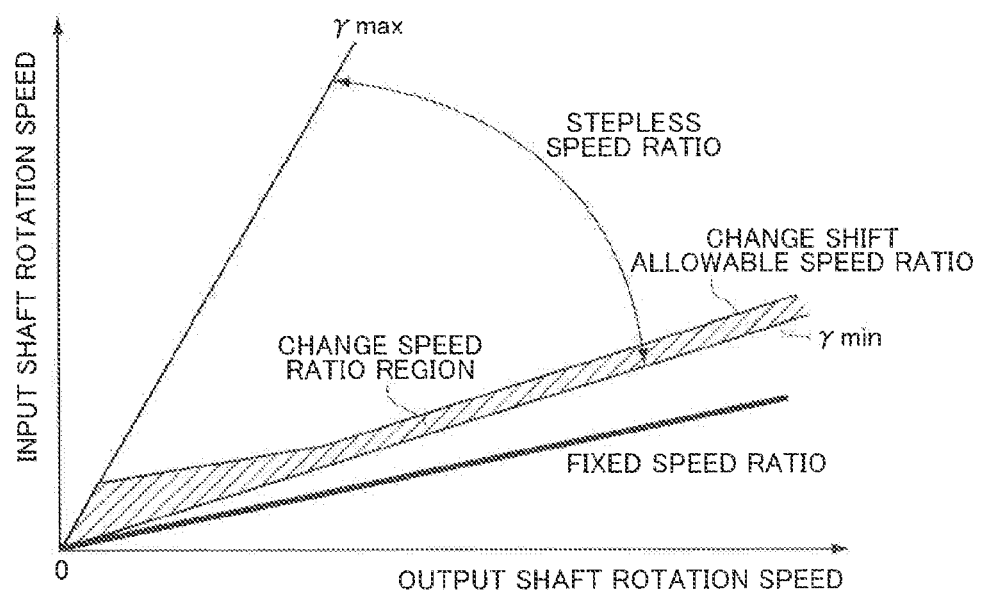
FIG. 5 is a graph for illustrating a change speed ratio region that is set at the time when control is executed by the controller for the vehicle transmission according to the invention.

It is determined whether the change shift is allowed. That is, it is determined whether the change shift is allowed (step S2). As described above, the controller according to the invention is configured to not only determine whether the change shift is required in accordance with the conventional art but also determine whether the change shift is allowed. For this purpose, in step S2, it is determined whether the change shift is allowed on the basis of the actual speed ratio of the CVT 8. Specifically, the actual speed ratio currently set in the CVT 8 is obtained, and the actual speed ratio is compared with a change speed ratio region. The change speed ratio region is, in other words, a change shift allowable region, and determines the range of the speed ratio of the CVT 8, which is set in order to determine a state where it is possible to appropriately carry out the change shift. For example, the change speed ratio region may be indicated as a hatched region in FIG. 4 and FIG. 5. FIG. 4 shows the change speed ratio region in the case where the speed ratio (fixed speed ratio) that is set by the gear train 10 is higher than the maximum speed ratio ($\gamma$max) within speed ratios (stepless speed ratio) that are allowed to be set by the CVT 8 as in the case of the automatic transmission 1 having the above-described configuration shown in FIG. 1. On the other hand, FIG. 5 shows the change speed ratio region in the case where the speed ratio (fixed speed ratio) that is set by the gear train 10 is lower than the minimum speed ratio ($\gamma$min) within speed ratios (stepless speed ratio) that are allowed to be set by the CVT 8.

The above-described state where it is possible to appropriately carry out the change shift indicates a state where a rotation speed difference between the engagement members of the clutch mechanism that is controlled from the released state to the engaged state in carrying out the change shift is lower than or equal to a predetermined value in this control example. For example, in the automatic transmission 1 having the above-described configuration shown in FIG. 1, when the controller carries out the change shift from the second transmission path including the gear train 10 to the first transmission path including the CVT 8, the change speed ratio region is set so that a rotation speed difference in the second clutch mechanism C2 that is engaged at that time becomes smaller than or equal to a predetermined value. On the contrary, when the controller carries out the change shift from the first transmission path including the CVT 8 to the second transmission path including the gear train 10, the change speed ratio region is set so that a rotation speed difference in the first clutch mechanism C1 that is engaged at that time becomes smaller than or equal to a predetermined value.

The above-described controls in step S1 and step S2 may be executed in parallel with each other as shown in the flowchart of FIG. 3. Alternatively, the controls in step S1 and step S2 may be executed sequentially. The sequence in this case may be such that step S1 is executed first or step S2 is executed first.

On the basis of the determination result as to whether the change shift is required in step S1 and the determination result as to whether the change shift is allowed in step S2, it is determined whether the state of the automatic transmission 1 requires the change shift and allows the change shift (step S3). Specifically, it is determined whether the change shift is required from the shift line chart or map of the automatic transmission 1 and the change shift is allowed on the basis of the fact that the actual speed ratio of the CVT 8 is a speed ratio within the change speed ratio region.

When it is determined that the state of the automatic transmission 1 requires the change shift and allows the change shift, and then affirmative determination is made in step S3, the process proceeds to step S4. The change shift is carried out. Specifically, in the case of the change shift from the second transmission path to the first transmission path, the first clutch mechanism C1 is controlled from the engaged state to the released state and the second clutch mechanism C2 is controlled from the released state to the engaged state. In the case of the change shift from the first transmission path to the second transmission path, the first clutch mechanism C1 is controlled from the released state to the engaged state, and the second clutch mechanism C2 is controlled from the engaged state to the released state. After that, the routine is once ended.

In contrast, when negative determination is made in step S3 because of the fact that it is not yet determined that the state of the automatic transmission 1 requires the change shift, or the state of the automatic transmission 1 does not yet allow the change shift, or it is not yet determined that the state of the automatic transmission 1 requires the change shift and the state of the automatic transmission 1 does not yet allow the change shift, the process proceeds to step S5. The change shift is prohibited. That is, until affirmative determination is made in step S3, the automatic transmission 1 is placed in a standby state of the change shift. After that, the routine is once ended.

As described above, in this control shown in the flowchart of FIG. 3, when the change shift for changing the transmission path, which transmits power between the input shaft 5 and output shaft 9 of the automatic transmission 1, is carried out between the first transmission path and the second transmission path, it is determined whether the change shift is allowed. That is, it is determined whether the actual speed ratio of the CVT 8 provided in the first transmission path is a speed ratio within the change speed ratio region set in order to appropriately carry out the change shift. When the actual speed ratio of the CVT 8 is a speed ratio outside the change speed ratio region, the change shift is not carried out.

More specifically, in the invention, it is determined whether a similar change shift to the conventional shift control is required, and it is determined whether the change shift is allowed. When the change shift is allowed in addition to determination that the change shift is required, that is, when the actual speed ratio of the CVT 8 is a speed ratio within the change speed ratio region, the change shift is carried out. Thus, for example, even when it is determined that the change shift is required on the basis of information about the output shaft rotation speed and the accelerator operation amount, but when the actual speed ratio of the CVT 8, set at that timing, is a speed ratio outside the change speed ratio region, the change shift is not carried out. That is, the changes shift is carried out only in an appropriate operating state where the speed ratio within the change speed ratio region is set in the CVT 8. Therefore, it is possible to prevent or suppress a shock that occurs at the time of a change shift and a decrease in the durability of the clutch mechanism that is engaged at the time of the change shift.

In setting a change speed ratio region suitable for a change shift as described above, a rotation speed difference between the engagement members of the clutch mechanism is considered. The change speed ratio region is set so that the rotation speed difference becomes smaller than a predetermined value when the change shift is carried out. Thus, in the case of carrying out a change shift, it is possible to set a rotation speed difference in the clutch mechanism to a state smaller than or equal the predetermined value. Therefore, it is possible to reliably prevent or suppress a shock that occurs at the time of a change shift and a decrease in the durability of the clutch mechanism due to a large rotation speed difference in the clutch mechanism.

SECOND CONTROL EXAMPLE

Figure 6:
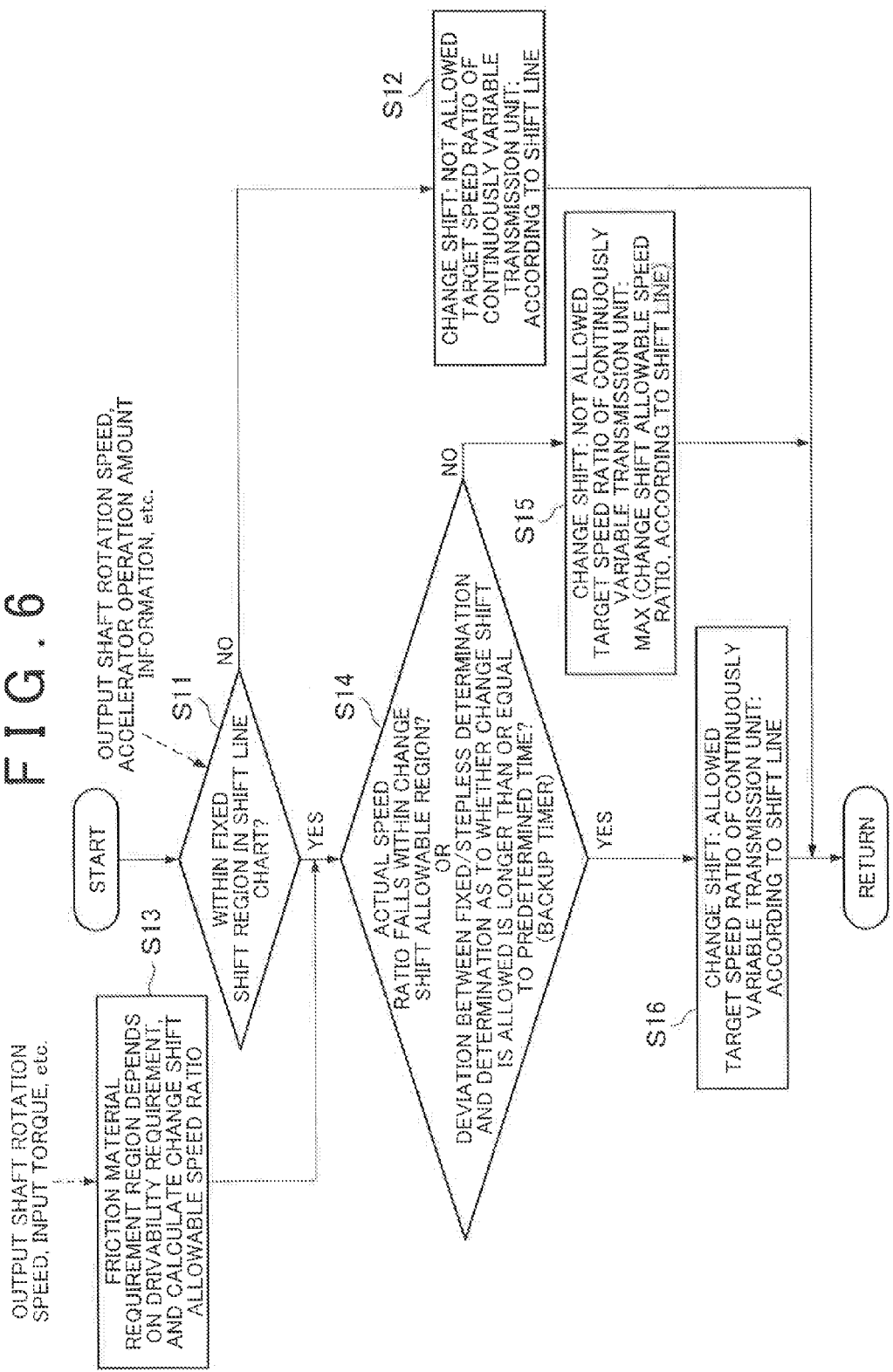
FIG. 6 is a flowchart for illustrating another example of control that is executed by a controller for a belt-type continuously variable transmission according to the invention.

FIG. 6 is a flowchart for illustrating a second control example that is executed by the controller according to the invention. The second control example is a control example in which, on the basis of the above-described first control example, a threshold in setting the change speed ratio region is corrected and a guard timer (backup timer), or the like, in determining whether to carry out a change shift is provided. This second control example shows an example in the case of carrying out the change shift from the second transmission path including the gear train 10 to the first transmission path including the CVT 8. In FIG. 6, initially, it is determined whether the operating state of the automatic transmission 1 is in a fixed shift region in the shift line chart (step S11). This determination may be carried out on the basis of the output shaft rotation speed or the vehicle speed, and the accelerator operation amount or the throttle opening degree. For example, it may be determined from the above-described shift line chart shown in FIG. 4 or the map.

When negative determination is made in step S11 because of the fact that the operating state of the automatic transmission 1 is not in the fixed shift region in the shift line chart, that is, the power transmission path in the automatic transmission 1 has been already set to the first transmission path including the CVT 8, the process proceeds to step S12. The change shift is prohibited. Shift control in the CVT 8 in this case is executed as usual on the basis of the shift line chart or the map. After that, the routine is once ended. As described above, in this control example, control assumes the case of carrying out the change shift from the second transmission path to the first transmission path. Thus, in this case, the routine is once ended without particularly executing control according to the invention.

In parallel with control in step S11 or before or after control of step S11, a change shift allowable speed ratio is obtained (step S13). The change shift allowable speed ratio is a speed ratio (stepless speed ratio) of the CVT 8, which is a threshold for defining the change speed ratio region in the invention. In this control example, for example, as shown in FIG. 4, the change shift allowable speed ratio is set as a speed ratio that defines the change speed ratio region in cooperation with the maximum speed ratio γmax of the CVT 8. The change shift allowable speed ratio is set as a speed ratio that defines the change speed ratio region in cooperation with the minimum speed ratio γmin of the CVT 8, for example, as shown in FIG. 5, when carrying out the change shift from the first transmission path including the CVT 8 to the second transmission path including the gear train 10.

Figure 7:
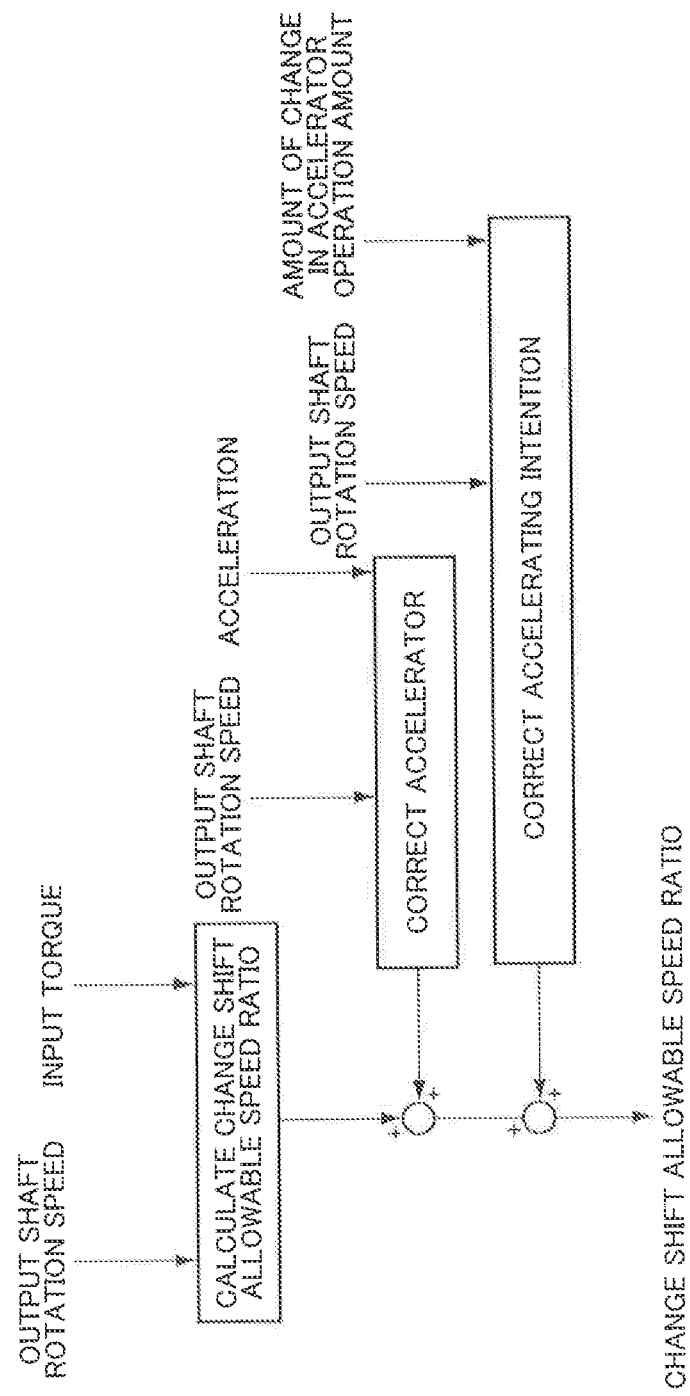
FIG. 7 is a block diagram for illustrating the procedure of correcting a change speed ratio region according to the invention.
Figure 8:
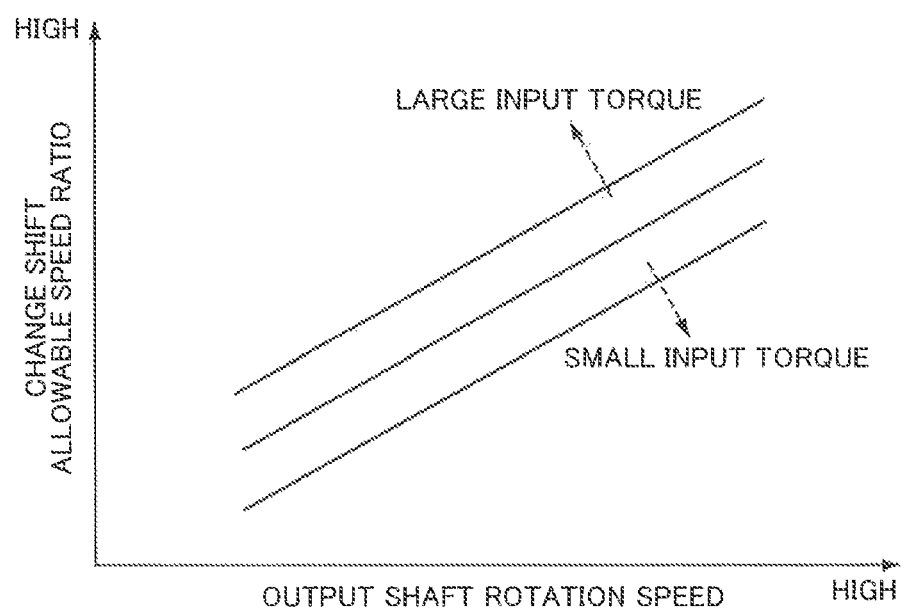
FIG. 8 is a graph for illustrating an example of a map that is used in correcting a change speed ratio region according to the invention.

Control for setting the change shift allowable speed ratio and the change speed ratio region will be specifically described. A block diagram of FIG. 7 shows the image of details of control in setting the change shift allowable speed ratio. The change shift allowable speed ratio is obtained on the basis of, for example, the output shaft rotation speed of the output shaft 9 and input torque that is transmitted to the input shaft 5. More specifically, the change shift allowable speed ratio is determined so that the width of the change speed ratio region narrows as the input torque increases. For example, a map associated with an input torque, an output shaft rotation speed and a change shift allowable speed ratio as shown in FIG. 8 is set in advance, and the change shift allowable speed ratio may be obtained from the map.

When the input torque is small, even when a time during which the clutch mechanism slips extends because of the fact that a rotation speed difference in the clutch mechanism (that is, the second clutch mechanism C2 in this control example) is engaged in carrying out the change shift, the amount of heat generated by friction at that time is relatively small. Therefore, an allowable range of the rotation speed difference in the clutch mechanism may be set relatively widely. In contrast, when the input torque is large, abrasion of friction plates and the amount of heat generated by friction in engaging the clutch mechanism increase. Thus, when a time during which the engagement members slip on each other extends in engaging the clutch mechanism, the extended time may influence the durability of the clutch mechanism. In this invention, by setting the change shift allowable speed ratio so that the width of the change speed ratio region narrows as the input torque increases as described above, it is possible to prevent or suppress a decrease in the durability of the clutch mechanism by reducing abrasion and the amount of generated heat of the friction plates in the above-described clutch mechanism.

Figure 9:
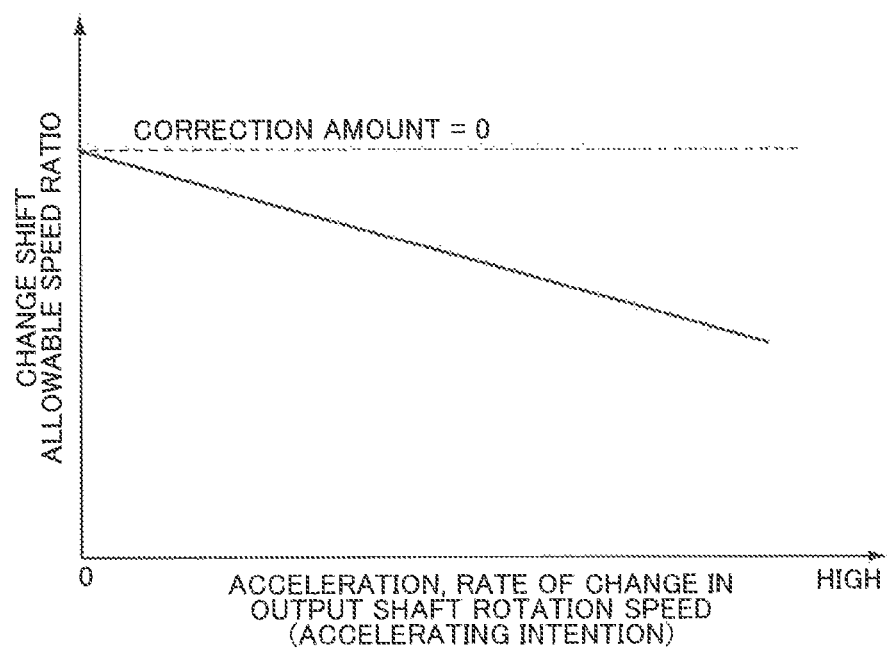
FIG. 9 is a graph for illustrating an example of a map that is used in correcting a change speed ratio region according to the invention.

In this invention, the change shift allowable speed ratio obtained on the basis of the output shaft rotation speed and the input torque as described above may be corrected in consideration of an acceleration of the vehicle Ve. Specifically, the change shift allowable speed ratio is corrected so that the width of the change speed ratio region expands as the acceleration of the vehicle Ve increases. Alternatively, the rate of change in the output shaft rotation speed is calculated, and the change shift allowable speed ratio is corrected so that the width of the change speed ratio region expands as the rate of change in the output shaft rotation speed increases. For example, as shown in FIG. 9, a map associated with the acceleration or the rate of change in the output shaft rotation speed and the change shift allowable speed ratio is set in advance, and the change shift allowable speed ratio may be corrected on the basis of the map.

In the configuration in which the CVT 8 and the gear train 10 that sets a speed ratio higher than the maximum speed ratio γmax of the CVT 8 as in the case of the automatic transmission 1 that is the controlled object in the invention, if the amount of change in vehicle speed or the acceleration of the vehicle Ve increases in carrying out the change shift from the gear train 10 to the CVT 8, an increase in vehicle speed may be faster than a shift in the CVT 8. As a result, there is a case where the speed ratio of the CVT 8 does not fall within the change speed ratio region and, therefore, the change shift is not carried out. In this invention, when the acceleration of the vehicle Ve is large or when the rate of change in the output shaft rotation speed is large and, as a result, the acceleration of the vehicle Ve increases, the change shift allowable speed ratio is corrected so that the width of the change speed ratio region relatively expands. Therefore, it is possible to avoid the above-described situation that the change shift is not carried out, and it is possible to appropriately carry out the change shift.

In this invention, it is possible to correct the change shift allowable speed ratio, which is obtained on the basis of the output shaft rotation speed and the input torque as described above, in consideration of driver's accelerating intention. Specifically, initially, it is estimated whether driver's accelerating intention is large or small. The magnitude of driver's accelerating intention may be, for example, estimated on the basis of at least any one of an operation amount and operation speed of driver's accelerator operation. That is, it may be estimated that driver's accelerating intention becomes larger as the operation amount of accelerator operation increases. Alternatively, it may be estimated that driver's accelerating intention becomes larger as the operation speed of accelerator operation increases. Alternatively, it may be estimated that driver's accelerating intention becomes larger as both the operation amount and operation speed of accelerator operation increase. When driver's accelerating intention is large, the acceleration of the vehicle Ve, which is caused by driver's accelerator operation, also increases. Thus, as described above, for a similar reason to the case of correction that the width of the change speed ratio region expands as the acceleration increases, the change shift allowable speed ratio is corrected so that the width of the change speed ratio region expands as the estimated driver's accelerating intention becomes larger. Therefore, it is possible to avoid the above-described situation that the change shift is not carried out, and it is possible to appropriately carry out the change shift. As well as the case of correction that the width of the change speed ratio region expands as the above-described acceleration increases in this case, for example, a map associated with driver's accelerating intention and the change shift allowable speed ratio is set in advance as shown in FIG. 9, and it is possible to correct the change shift allowable speed ratio on the basis of the map.

On the other hand, when affirmative determination is made in step S11 because the operating state of the automatic transmission 1 falls within the fixed shift region in the shift line chart, that is, the power transmission path in the automatic transmission 1 is set to the second transmission path including the gear train 10, and when the change shift allowable speed ratio is set in step S13, the process proceeds to step S14. It is determined whether the actual speed ratio set in the CVT 8 is a speed ratio within the change shift allowable region, that is, within the change speed ratio region, or it is determined whether the duration of a state where determination to change from the fixed shift to the stepless shift deviates from determination as to whether the change shift is allowed has reached a predetermined time a or longer. The state where determination to change from the fixed shift to the stepless shift deviates from determination as to whether the change shift is allowed is a state where it is determined to change from the fixed shift to the stepless shift, that is, it is determined that the change shift is required in determination as to whether the change shift is required, and the change shift is not allowed in determination as to whether the change shift is allowed.

When negative determination is made in step S14 because of the fact that the actual speed ratio set in the CVT 8 is a speed ratio outside the change speed ratio region and the duration of the state where the actual speed ratio is a speed ratio outside the change speed ratio region has not reached the predetermined time a yet from the timing at which it is determined that the change shift is required in determination as to whether the change shift is required, the process proceeds to step S15. The change shift is prohibited. Shift control in the CVT 8 in this case is executed by setting a target speed ratio to the maximum speed ratio γmax or a speed ratio within the change speed ratio region. Alternatively, shift control is executed as usual on the basis of the shift line chart or the map. After that, the routine is once ended.

In short, in this case, even when it is determined that the change shift from the second transmission path to the first transmission path is required on the basis of the traveling state of the vehicle Ve and the operating state of the automatic transmission 1, for example, the actual speed ratio of the CVT 8 has not returned to the maximum speed ratio γmax or a speed ratio within the change speed ratio region. That is, this state is not suitable for carrying out the change shift. Thus, in this case, the change shift is not carried out. Therefore, for example, it is possible to reliably prevent or suppress a shock that occurs at the time of a change shift and a decrease in the durability of the clutch mechanism due to a large rotation speed difference in the clutch mechanism.

In contrast, when affirmative determination is made in step S14 because of the fact that the actual speed ratio set in the CVT 8 is a speed ratio within the change speed ratio region, the process proceeds to step S16. The change shift is carried out. Shift control in the CVT 8 in this case is executed as usual on the basis of the shift line chart or the map. After that, the routine is once ended.

In addition, even when the actual speed ratio set in the CVT 8 is a speed ratio outside the change speed ratio region, but when the duration of the state where the actual speed ratio set in the CVT 8 is a speed ratio outside the change speed ratio region has already reached the predetermined time a or longer from the timing at which it is determined that the change shift is required in determination as to whether the change shift is required, affirmative determination is made in step S14. The process proceeds to step S16, and control similar to the above control is executed. That is, the change shift is carried out.

As described above, in the control shown in the flowchart of FIG. 6, the change speed ratio region that is set in order to determine whether the change shift is allowed as described above is changed in response to at least one of the output shaft rotation speed and the input torque. For example, the change shift allowable speed ratio is set so that the width of the change speed ratio region narrows as the input torque increases. Alternatively, the change shift allowable speed ratio is corrected so that the width of the change speed ratio region expands as the acceleration of the vehicle Ve or the rate of change in the output shaft rotation speed increases. Furthermore, driver's accelerating intention is estimated, and the change shift allowable speed ratio is corrected and set so that the width of the change speed ratio region expands as the estimated accelerating intention increases. Therefore, it is possible to carry out an appropriate change shift in correspondence with the traveling state of the vehicle Ve or the operating state of the automatic transmission 1.

According to the invention, when it is determined that the change shift is required as described above, even when the change shift is prohibited because of the fact that the actual speed ratio of the CVT 8 is a speed ratio outside the change speed ratio region, but when the predetermined time a or longer elapses from the timing at which it is determined that the change shift is required, the change shift is carried out. For example, when the amount of change in vehicle speed or the acceleration increases, an increase in vehicle speed is faster than a shift in the CVT 8 and, with the result that there is a case where the speed ratio of the CVT 8 does not fall within the change speed ratio region and, therefore, the change shift is not carried out. In contrast, in this invention, by providing the above-described predetermined time a as a guard in advance, it is possible to avoid a situation that the change shift is not carried out as described above, and it is possible to appropriately carry out the change shift in accordance with determination as to whether the change shift is required.

Figure 10:
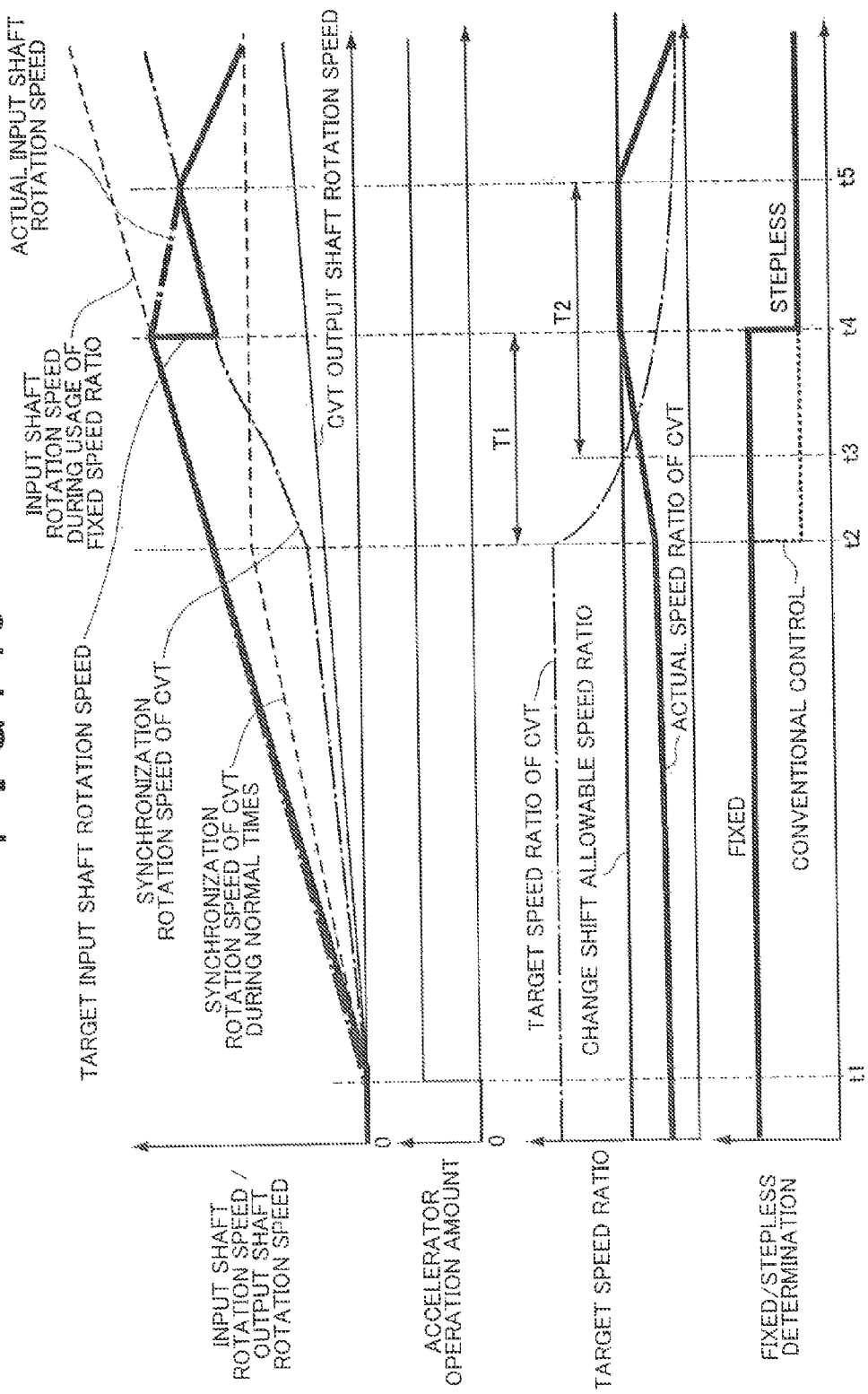
FIG. 10 is a time chart that shows a change in target speed ratio, changes in rotation speeds of an input shaft and output shaft, and the like, when control is executed by the controller for the vehicle transmission according to the invention.

FIG. 10 is a time chart that shows changes in the rotation speeds of the input shaft and the output shaft and changes in the target speed ratio and actual speed ratio in the case of executing shift control regarding a change shift according to the invention as described above. The example shown here, for example, assumes the case where, at the time when the vehicle Ve stops by rapid braking, the vehicle starts moving again in a state where the actual sped ratio of the CVT 8 has not returned to the maximum speed ratio or a high speed ratio suitable for the vehicle to start moving. In the example shown in the time chart of FIG. 10, the actual speed ratio of the CVT 8 deviates toward a low speed ratio side with respect to a target speed ratio of the CVT 8. The target speed ratio of the CVT 8 is set on the basis of the output shaft rotation speed of the output shaft 9. That is, the actual speed ratio of the CVT 8, which should be originally returned to the maximum speed ratio side at the time when the vehicle Ve stops, cannot follow the target speed ratio that is set for the maximum speed ratio side. In this case, in order to obtain large driving force for causing the vehicle Ve to start moving, the automatic transmission 1 is set to a state where power is transmitted via the second transmission path including the gear train 10 that sets a speed ratio further higher than the maximum speed ratio of the CVT 8.

When driver's accelerator operation is carried out at time t1 in this state and then the vehicle Ve is caused to start moving, an actual input rotation speed that is transmitted to the input shaft 5 gradually increases following a target input shaft rotation speed. At this time, in control during normal times in which control according to the invention is not executed, with an increase in the actual input shaft rotation speed and the synchronization rotation speed of the CVT 8, the change from the fixed shift to the stepless shift, that is, the change shift from the second transmission path to the first transmission path, is carried out at time t2. However, in this case, because there is still a large deviation between the actual speed ratio and target speed ratio of the CVT 8, a rotation speed difference in the second clutch mechanism C2 that is engaged at the time of the change shift is large, so it may lead to an engagement shock and a decrease in the durability of the friction materials.

Therefore, in this invention, different from conventional determination as to whether the change shift is required, it is determined whether it is possible to carry out the change shift in an appropriate state where it is possible to suppress an engagement shock and a decrease in the durability of the friction materials, that is, whether the change shift is allowed. For this purpose, as shown in the item of the target speed ratio in FIG. 10, the change shift allowable speed ratio is set. As described above, the change shift allowable speed ratio is a speed ratio of the CVT 8, which is a threshold for defining the change speed ratio region in this invention.

While the vehicle Ve is caused to start moving after time t1, a shift is also carried out in the CVT 8. At time t4, when the actual speed ratio of the CVT 8 reaches the change shift allowable speed ratio, that is, when the actual speed ratio of the CVT 8 becomes a speed ratio within the change speed ratio region, the change shift from the second transmission path to the first transmission path is carried out. In conventional control, the change shift is carried out at the timing of time t2. In contrast, in this invention, in a period T1 from time t2 to time t4 at which the change shift is allowed in determination as to whether the change shift is allowed, the change shift is prohibited.

After the change shift is carried out at time t4, the actual speed ratio of the CVT 8 is not immediately caused to follow the target speed ratio but the actual speed ratio is controlled to follow the change shift allowable speed ratio until time t5. In conventional control, after time t3 at which the target speed ratio becomes lower than the change shift allowable speed ratio, the actual speed ratio of the CVT 8 is controlled to follow the target speed ratio. In contrast, in this invention, in a period T2 from time t3 to time t5 at which the synchronization rotation speed of the CVT 8 becomes higher than the actual input shaft rotation speed, the actual speed ratio is controlled to follow the change shift allowable speed ratio in consideration of friction in the second clutch mechanism C2. After time t5, the actual speed ratio is controlled to follow the original target speed ratio. That is, ordinary shift control is executed.

The relationship between the above-described specific example and the invention will be described. Functional means for executing step S3, step S4, step S11, step S14 and step S16 corresponds to "performing means" in the invention. Functional means for executing step S2 and step S13 corresponds to "setting means" in the invention.

In the above-described specific example, in the configuration of the automatic transmission 1, an example in which the speed ratio of the gear train 10 is set so as to be higher than the maximum speed ratio of the CVT 8 is described. In this invention, the automatic transmission 1 that is employed as the controlled object may be configured to use the gear train 10 to set a speed ratio that is not allowed to be set by the CVT 8. Thus, the automatic transmission 1 of the invention may be, for example, configured such that the speed ratio of the gear train 10 is lower than the minimum speed ratio of the CVT 8. With such a configuration, when the lockup clutch 4 is engaged or when the vehicle travels by operating the engine 2 at a low load, the engine rotation speed is allowed to be set to a rotation speed lower than that when torque is transmitted by the CVT 8. Therefore, it is possible to further improve fuel economy of the engine 2. The gear train 10 may be configured to selectively set any one of a plurality of speed ratios.

DESCRIPTION OF REFERENCE NUMERALS 1 automatic transmission, 2 engine (driving force source), 5 input shaft, 8 belt-type continuously variable transmission mechanism (CVT; first transmission mechanism), 9 output shaft, 10 gear train (second transmission mechanism), 13 drive shaft (output member), 14 electronic control unit (ECU), B brake mechanism, C1 first clutch mechanism, C2 second clutch mechanism, C3 third clutch mechanism, Ve vehicle

The invention claimed is:

1. A controller for a vehicle, the vehicle including a predetermined clutch mechanism having a first clutch and a second clutch, and a transmission that includes a first transmission mechanism that continuously changes its speed ratio and a second transmission mechanism having a set speed ratio different from that of the first transmission mechanism, a first transmission path including the first transmission mechanism and a second transmission path including the second transmission mechanism being provided in parallel with each other between an input shaft to which torque is input from a driving force source of the vehicle and an output shaft that outputs torque to an output member, the transmission being configured to carry out transmission of power between the input shaft and the output shaft via one of the first transmission path and the second transmission path, the controller comprising:
an electronic control unit configured to:
(a) determine whether a change shift is required in response to at least any one of a traveling state of the vehicle or an operation state of the transmission;
(b) carry out the change shift for changing a path of the transmission of power between the first transmission path and the second transmission path by engaging one of the first clutch and second clutch and disengaging the other of the first clutch and second clutch;
(c) set a change speed ratio region that defines a range of a speed ratio of the first transmission mechanism such that a rotation speed difference between engagement members of the clutch mechanism, which are engaged with each other in carrying out the change shift, is smaller than or equal to a predetermined value; and
(d) carry out the change shift:
when a speed ratio within the change speed ratio region is set in the first transmission mechanism;
when the electronic control unit determines that the change shift is required and the speed ratio within the change speed ratio region is set in the first transmission mechanism; and
after the electronic control unit determines that the change shift is reqauired and when a time during which a speed ratio outside the change speed ratio region is set in the first transmission mechanism has reached a predetermined time or longer.

2. The controller according to claim 1, wherein
the electronic control unit is configured to change and set a width of the change speed ratio region in response to information about at least any one of an output shaft rotation speed of the output shaft or an input torque that is input to the input shaft.

3. The controller according to claim 2, wherein
the electronic control unit is configured to narrow the width of the change speed ratio region as the input torque increases.

4. The controller according to claim 2, wherein
the electronic control unit is configured to expand the width of the change speed ratio region as a rate of change in the output shaft rotation speed increases.

5. The controller according to claim 2, wherein
the electronic control unit is configured to detect an acceleration of the vehicle, and
the electronic control unit is configured to expand the width of the change speed ratio region as the acceleration increases.

6. The controller according to claim 2, wherein
the electronic control unit is configured to detect at least one of an operation amount or an operation speed of driver's accelerator operation, and
the electronic control unit is configured to expand the width of the change speed ratio region as at least any one of the operation amount or the operation speed of the accelerator operation increases.

\* \* \* \* \*